United States Patent [19]

Naito et al.

[11] 3,933,762
[45] Jan. 20, 1976

[54] HOT MELT ADHESIVES FROM LACTAM COPOLYAMIDES

[75] Inventors: Nagayoshi Naito; Sadakatu Hashimoto; Yoshiyuki Komuro; Tutomu Suyama; Yukio Yonekura, all of Nagoya, Japan

[73] Assignee: Toray Industries, Inc., Tokyo, Japan

[22] Filed: June 19, 1974

[21] Appl. No.: 480,627

[30] Foreign Application Priority Data
June 27, 1973 Japan................................ 48-71650
July 17, 1973 Japan................................ 48-79854

[52] U.S. Cl............. 260/78 L; 260/37 N; 156/331; 117/161 P
[51] Int. Cl.² .......... C08G 77/02; C08G 69/14; C09J 3/16
[58] Field of Search .................. 260/78 L, 37 N

[56] References Cited
UNITED STATES PATENTS

| | | | |
|---|---|---|---|
| 2,252,555 | 8/1941 | Carothers........................... | 260/78 L |
| 2,856,373 | 10/1958 | Lowery et al. ................. | 260/78 L X |
| 3,214,414 | 10/1965 | Waltersperger.................... | 260/78 L |
| 3,476,711 | 11/1969 | Muller et al....................... | 260/78 L |
| 3,515,702 | 6/1970 | Raabe .............................. | 260/78 L |
| 3,607,610 | 9/1971 | Fukuma et al. ................. | 260/78 L X |
| 3,784,495 | 1/1974 | Sprauer........................... | 260/78 L X |
| R27,939 | 3/1974 | Raabe .............................. | 260/78 L |

*Primary Examiner*—Lucille M. Phynes

[57] ABSTRACT

Hot-melt adhesives for fibers consisting essentially of copolyamides obtained by polymerizing four monomer units, namely, ε-caprolactam, hexamethylenediammonium adipate, hexamethylenediammonium sebacate, and laurolactam in specific proportions.

5 Claims, No Drawings

3,933,762

HOT MELT ADHESIVES FROM LACTAM COPOLYAMIDES

BACKGROUND OF THE INVENTION

This invention relates to hot-melt adhesives for fibers, and in particular relates to hot-melt adhesives made from specified copolyamides. Hot-melt adhesives are used for covering articles of various types, for instance. Such adhesives may be furthermore used as a binder layer for two different materials which have to be bonded together within only a short period of time. Especially, hot-melt adhesives are useful for bonding at least two different fabrics, allowing the usual sewing step to be omitted.

In general, the adhesion process is carried out in such a manner that the hot-melt adhesives are inserted in the form of a powder, emulsion, fiber, or film between the fabrics, and the resulting composite is heated to a temperature at which the hot-melt adhesives are melted, and pressed. Hot-melt adhesives for fibers are usually composed of synthetic polymers. Synthetic polymers composing hot-melt adhesives are required to have a relatively low melting point e.g. 100°–130°C. When the melting point of the synthetic polymer is too high, the step of heating and pressing in the adhesion process has to be carried out at a high temperature, and therefor the fabrics themselves tend to be deteriorated by heating. On the other hand, when the melting point of the synthetic polymer is too low, too much synthetic polymer is infiltrated into the interior of the fabrics during a step of heating and pressing which results in rendering the touch of the fabrics hard and making it difficult to obtain a high adhesive strength, because the infiltrated synthetic polymer does not function as an adhesive agent for the fabrics.

Furthermore, synthetic polymers composing hot-melt adhesives are required to have strong adhesive power.

Heretofore, thermoplastic polymers such as polyethylene, ethylene-vinyl-acetate copolymer, ethylene-ethylacrylate copolymer, polyvinylacetate, polyvinylbutyral, and polyamide have been used for hot-melt adhesives. In particular, copolyamides as described in U.S. Pat. No. 3,515,702 have been most preferably used. This patent teaches the use of hot-melt adhesives consisting essentially of a copolyamide of:
  a. laurolactam and;
  b. a co-condensible member selected from the group consisting of caprolactam, hexamethylene diamine adipate, hexamethylene diamine sebacate, and mixtures thereof;
in which copolyamide the weight percent of units derived from laurolactam is from 80 % to 20 % and the weight percent of units derived from the co-condensible member is from 20 % to 80 %.

However, according to the teachings of this patent, superior hot-melt adhesives consisting of copolyamides having a melting point within the range of 100°–130°C and having a strong adhesive power cannot be necessarily obtained.

Furthermore, hot-melt adhesives of this patent are very expensive because a high content of the more expensive laurolactam has to be used for obtaining the desired copolyamide.

Accordingly, the first object of present invention is to provide hot-melt adhesives consisting of copolyamides having a melting point within range of 100°–130°C, and having strong adhesive power, at a relatively low cost.

On the other hand, when conventional hot-melt adhesives of copolyamides are used for manufacturing clothing of thin cloth, such as summer wear, there is the serious disadvantage that the clothing has poor appearence because the light which penetrates through the thin cloth is reflected on the surface of the bonding layer consisting of the hot-melt adhesives.

Hot-melt adhesives are very frequently applied for making clothing for suits by bonding a core cloth and a right-side or outer cloth. In this case, conventional hot-melt adhesives cannot provide clothing for suits of good appearence because of the disadvantage mentioned above.

Heretofore, the step of adding conventional delustrants to hot-melt adhesives has been proposed for eliminating this disadvantage. This method is undesirable because it renders the adhesive power of the hot-melt adhesives poor.

Accordingly, the second object of present invention is to obtain hot-melt adhesives which make it possible to provide clothing for summer wear with good appearence. Other objects and advantages of present invention will become further apparent hereinafter.

SUMMARY OF THE INVENTION

It has been found that hot-melt adhesives for fibers consisting essentially of copolyamides having a melting point within the range of 100°–130°C and having strong adhesive power are provided at relatively low cost by providing a specific copolyamide obtained by polymerizing four monomer units, namely, $\epsilon$-caprolactam, hexamethylenediammonium adipate, hexamethylenediammonium sebacate, and laurolactam in the following proportions:

| A. | (a) | $\epsilon$-caprolactam: | 30~75wt% |
| | (b) and | hexamethylenediammonium adipate: | 5~40wt% |
| | (c) and | hexamethylenediammonium sebacate: | 20~65wt% |
| B. | | laurolactam: | 5~20wt% | wherein the total of (a), (b), and (c) is 100 wt% and the total of A and B is 100 wt%.

DETAILED DESCRIPTION OF THE INVENTION

Copolyamides to be used in accordance with the present invention may be produced in manners known per se. Either mixture of $\epsilon$-caprolactam, hexamethylenediamine, adipic acid, sebacic acid, and laurolactam or a mixture of $\epsilon$-caprolactam, hexamethylenediammonium adipate, hexamethylenediammonium sebacate, and laurolactam may be subjected to polymerization.

Polymerization is usually carried out in the presence of a small amount of water as an initiator. Other catalysts, chain terminating agents and/or other additives may be used in accordance with the present invention.

Polymerization may be conducted either batch-wise or as a continuous step.

It is preferred to carry out the polymerization by heating a mixture of the monomers in an inert atmosphere to 250°–300°C under elevated pressure and holding the mixture at this temperature for a few hours, followed by holding the mixture at this tempereture at atomospheric pressure. The thus obtained copolyamides are shaped into films, fibers, and powders, or are mixed with a suitable solvent to form emulsions, and then the copolyamides are used as hot-melt adhesives.

The copolyamides used in the present invention have a melting point within the range from 100°C to 130°C. Therefore, the copolyamides of the present invention can be advantageously applied as hot-melt adhesives for fibers.

In the present invention, the melting point is defined to be a maximum peak temperature of melting measured by a differential scanning calorimeter (DSC-1B) manufactured by Perkin Elmer Company at 10°C/min of increasing rate of temperature.

Furthermore, the copolyamides of the present invention are characterized in large amounts of amorphous structures, because they are composed of four monomer units, and they are crystallized at a low speed above their glass transition temperatures.

Accordingly, the adhesive power of the hot-melt adhesives of the present invention is not substantially changed during adhesion processing, and the clothing obtained by using these hot-melt adhesives has an excellent soft touch.

The copolyamides used in this invention contain a small amount of the laurolactam unit, and therefore the concentration of the amide groups of the copolyamides is relatively high. Accordingly, the hot-melt adhesives obtained from these copolyamides have improved adhesive power, especially when a steam press is used.

For obtaining more improved hot-melt adhesives in the present invention, it is preferred to use a copolyamide in the form of a powder on whose surface are adhered 0.01–0.5 wt%, based on the weight of the copolyamide, of an inorganic compound having a particle diameter of $0.001\mu$–$50\mu$ which can act as a nucleating agent for the polyamides, and 0.05–0.3 wt% based on the weight of the copolyamide of at least one compound selected from the group consisting of higher aliphatic amides and metal salts of higher aliphatic carboxylic acids.

As the inorganic compounds in the present invention, for example, talc, mica, calucium carbonate, magnesium oxide, silica, magnesium hydroxide, and calcium sulphate may be used. Talc is most preferably used.

The inorganic compounds are used in the amount of 0.01–0.5 wt%, preferably 0.05–0.3 wt%, based on the weight of the copolyamide.

On the other hand, as the organic compounds in the present invention, the amides or metal salts of higher aliphatic carboxylic acids can be used. Methylene-bis-stearylamide and metal salt of stearyl acid are most preferable. As metals, for example, magnesium, lithium, and aluminum are used. These organic compounds are used in an amount of 0.05–0.3 wt%, preferably 0.05–0.1 wt%, based upon the weight of the copolyamides.

With regard to both inorganic substances and organic compounds, when the content is lower than the lower stated limit, the desired effect cannot be obtained, and when the content is higher than the upper stated limit, the desired effect levels off and the adhesive power and processability of the resulting hot-melt adhesives tends to go down.

The inorganic compounds and organic compounds may be adhered on the surface of copolyamide powder according to the conventional method by using the well-known conventional blender, for example, a Müller mixer.

Hot-melt adhesives obtained from copolyamide powders on whose surface the inorganic and organic compounds are adhered can provide clothing of good appearance. For example, when a thin fabric and a core fabric are bonded by using the hot-melt adhesives of the present invention, the resulting clothing has a excellent appearence without sparkling when exposed to light.

EXAMPLE 1

Mixtures of laurolactam, ε-caprolactam, hexamethylenediammonium adipate, and hexamethylene diammonium sebacate in the proportions described in Table 2 were polymerized in an autoclave according to the conditions described in Table 1. In each run, 0.01 mol of benzoic acid per mol of total monomer unit was added as a chain terminating agent.

Table 1

| Period from start (hrs) | temp. (°C) | Press (kg/cm²) |
|---|---|---|
| 0 ~1.5 | 25    235 | 0~17.5 |
| 2.0~3.5 | 235    280 | 17.5 |
| 3.5~5.5 | 280    283 | 17.5~0 |
| 5.5~7.0 | 283    285 | 0 |

The melting points, fluidities, and adhesive strengths of the resulting copolyamides were measured according to the following methods.

a. Melting point is defined to be the maximum peak temperature of melting measured by a differential scanning calorimeter (DSC-1B) manufactured by Perkin Elmer Company at 10°C/min. of increasing rate of temperature.

b. Fluidity is intended to be represented by melting viscosity (poises) measured at 200°C under 10 Kg/cm² of load a using flow tester provided with nozzle of 0.5 mm $\phi$ × 1 mmL.

c. Adhesive strength;

The copolyamides were crushed into powders having a particle size of 200–350$\mu$.

These powders were homogeneously placed between two mixed spun fabrics of polyethyleneterephthalate fiber and cotton at the rate of 100g/m².

The resulting composite was hot-pressed at 140°C under a pressure of 350g/cm² for bonding the two fabrics.

The strength (g/2cm width) necessary to separate the thus bonded fabrics at a speed of 10mm/min. was measured. Adhesive strength of the copolyamides is represented by this strength.

The results are described in Table 2.

Table 2

| Run No. | Proportions of monomers (parts by weight) | | | | Melting point (°C) | Fluidity (poise) | Adhesive strength (g/2cm width) |
|---|---|---|---|---|---|---|---|
| | A | B | C | D | | | |
| 1 | 15.0 | 34.0 | 17.0 | 34.0 | 104 | 1800 | 950 |
| 2 | 15.0 | 28.33 | 28.33 | 28.33 | 129 | 1700 | 1300 |
| 3 | 15.0 | 34.64 | 15.73 | 34.64 | 115 | 1900 | 900 |
| 4 | 15.0 | 38.25 | 8.5 | 38.25 | 112 | 1800 | 950 |

In Table 2, A,B,C, and D have the following meanings;
A; laurolactam
B; μ-caprolactam
C; hexamethylenediammonium adipate
D; hexamethylenediammonium sebacate As is apparent from Table 2, the copolyamides of the present invention have low melting points, high fluidities, and high adhesive strengths, and therefor they can be preferably used as hot-melt adhesives for fibers.

EXAMPLE 2

The same polymerizations were carried out as in Example 1, except changing the proportions of the four monomer units. And melting points, fluidities, and adhesive strengths of the resulting copolyamides were measured according to the same method as in Example 1. The results are shown in Table 3.

Table 3

| Run No. | Proportions of monomers (parts by weight) | | | | Melting point (°C) | Fluidity (poise) | Adhesive strength (g/2cm width) |
|---|---|---|---|---|---|---|---|
| | A | B | C | D | | | |
| 1 | 20.0 | 36.0 | 8.0 | 36.0 | 102 | 1700 | 1200 |
| 2 | 17.5 | 37.125 | 8.25 | 37.125 | 106 | 1750 | 1200 |
| 3 | 15.0 | 38.25 | 8.5 | 38.25 | 112 | 1800 | 950 |
| 4 | 10.0 | 40.5 | 9.0 | 40.5 | 119 | 1800 | 950 |
| 5 | 7.0 | 41.85 | 9.3 | 41.85 | 124 | 1900 | 900 |
| 6 | 5.0 | 42.75 | 9.5 | 42.75 | 127 | 1900 | 900 |
| 7 | 1.0 | 44.55 | 9.9 | 44.53 | 133 | 1950 | 800 |

In Table 3, A,B,C, and D have the following meanings;
A; laurolactam
B; ε-caprolactam
C; hexamethylenediammonium
D; hexamethylenediammonium sebacate As is apparent from Table 3, the copolyamides of the present invention have low melting points, high fluidities, and high adhesive strengths, and therefor they can be preferably used for as hot-melt adhesives for fibers.

EXAMPLE 3

The same polymerizations as in Example 1 were performed, except for changing the proportions of the four monomer units.

Melting points of the resulting copolyamides were measured according to the same method as in Example 1. The results are shown in Table 4.

Table 4

| Run No. | Proportions of monomers (parts by weight) | | | | Melting point (°C) |
|---|---|---|---|---|---|
| | A | B | C | D | |
| 1 | 17.5 | 26.8 | 28.9 | 26.8 | 127 |
| 2 | 15.0 | 28.2 | 28.1 | 28.2 | 126 |
| 3 | 12.5 | 30.2 | 27.1 | 30.2 | 125 |
| 4 | 10.0 | 32.4 | 25.2 | 32.4 | 124 |
| 5 | 5.0 | 35.6 | 23.8 | 35.6 | 127 |
| 6 | 17.7 | 29.7 | 23.1 | 29.7 | 112 |
| 7 | 15.0 | 30.6 | 23.8 | 30.6 | 116 |
| 8 | 17.0 | 28.5 | 25.5 | 28.5 | 117 |
| 9 | 15.0 | 29.3 | 26.4 | 29.3 | 121 |
| 10 | 17.5 | 33.0 | 16.5 | 33.0 | 103 |

In Table 4, A,B,C, and D have the following meanings;
A; laurolactam
B; ε-caprolactam
C; hexamethylenediammonium adipate
D; hexamethylenediammonium sebacate As is apparent from Table 4, the copolyamides of the present invention have low melting points within the range from 100°C to 130°C in spite of the fact that they contain a small amount of laurolactam.

EXAMPLE 4

A mixture of 38.25 parts by weight of ε-caprolactam, 8.5 parts by weight of hexamethylenediammonium adipate, 38.25 parts by weight of hexamethylene diammonium sebacate, and 15 parts of laurolactam was polymerized according to the method described in Example 1.

The resulting copolyamide was formed into pellets, and they were crushed into powders after being cooled to −20°C.

45% by weight of the powders had a particle size within the range from 63μ to 177μ, namely, from 80 mesh to 250 mesh.

100 parts by weight of the thus obtained powders were sufficiently mixed with both 0.3 part by weight of talc having a particle size of 0.01–2μ and 0.05 part by weight of lithium stearate in a Müller type mixer.

Thereafter, the resulting powders were dotted at a rate of 1.5 mg per single spot on a core cloth made from cotton using a copper sheet having four orifices of 1 mmφ per 1 cm².

Many spots formed on the core cloth were heated to melt the surfaces of the spots, and thereafter, on the resulting core cloth, a thin right-side or outer cloth made from a mixed spun fabric of polyethyleneterephthalate fiber and hemp was placed.

The resulting composite was hot-pressed at 150°C for 15 minutes. The thus-bonded cloth had an excellent appearence and never sparkled under exposure to sunshine.

When this value of reflexibility is less than 40 %, preferably less than 20 %, the powders can be excellent hot-melt adhesives, by which a bonded final product, for example, clothing, with good appearence can be obtained.

Table 5

| Run No. | Inorganic Compound to be added | Reflexibility A* | B** |
|---|---|---|---|
| 1 | none | — | 89.0 |
| 2 | none | 68.1 | — |
| 3 | talc | 6.8 | 15.68 |
| 4 | kaolin | 61.2 | 73.30 |
| 5 | mica | 20.8 | 26.98 |
| 6 | barium sulphate | 62.5 | 69.9 |
| 7 | calcium sulphate | 39.4 | 47.0 |
| 8 | calcium carbonate | 34.8 | 41.9 |
| 9 | silica | 40.0 | 42.22 |
| 10 | magnesium oxide | 7.50 | 7.78 |
| 11 | titanium oxide | 82.0 | 86.0 |
| 12 | aluminum borate | 80.0 | 89.0 |
| 13 | magnesium hydroxide | 39.4 | 47.0 |

A* means that magnesium stearate was added and B** means that magnesium stearate was not added.

EXAMPLE 5

A mixture of 33 parts by weight of ε-caprolactam, 16.5 parts by weight of hexamethylenediammonium adipate, 33 parts by weight of hexamethylenediammonium sebacate and 17.5 parts by weight of laurolactam was polymerized according to the same method as in Example 1. The resulting copolyamide was formed into pellets, and they were crushed into powders having a particle size of 80–20 mesh according to the same method as in Example 4. 100 parts by weight of the powders were mixed with 0.2 part by weight of dyestuff "Sumitomo Black" (manufactured by Sumitomo Chemical Company Limited) in the small Henschel mixer. Thus, dark gray powders were obtained. To 100 parts by weight of these dark gray powders, 1 part by weight of many kinds of inorganic compounds discribed in Table 5 and 0.5 part by weight of magnesium stearate were added, and the resulting composition was completely mixed in a mortar.

Many kinds of powders thus obtained were dispersed on a cover glass used for a microscope to form a layer of about 1.5 mm width. Then the cover glass was put on a hot plate maintained at 180°C and was heated for thirty minutes to melt the powders which were put on the cover glass.

After melting the powders, the cover glass was put on an asbestos cloth and the molten powders were slowly cooled and solidified. The reflexibility of the surface of the solidified powders was measured using Gloss Meter Type GM-3 (manufactured by Murakami Shikisai Research) at 60° of measurement angle. Results are shown in Table 5.

For comparison, two runs were carried out, one with both nucleating agent and magnesium stearate not added, and the other with only magnesium stearate was added. These results are also shown in Table 5.

It is apparent from Table 5, that talc, mica, calcium sulphate, calcium carbonate, silica, magnesium oxide, and magnesium hydroxide are preferable as inorganic compounds, namely, nucleating agents to be added in the present invention.

EXAMPLE 6

The same copolyamide powders as in Example 4 were prepared. 100 parts by weight of these powders were mixed with 0.3 part by weight of an inorganic compound described in Table 6 and 0.2 part by weight of dye stuff, Sumitomo Black (manufactured by Sumitomo Chemical Company Limited) for about 20 minutes in a Henschel mixer.

To the resulting gray powders, 0.5 part by weight of many kinds of organic compounds described in Table 6 were added, and the resulting compositions were mixed for 20 minutes in the Henschel mixer.

The thus obtained powders were dotted on a black core cloth made from wool by using a dot-coating machine.

The black core cloth was overlapped on a thin outer cloth of brown which was made from wool, and the resulting composite was hot-pressed to prepare a bonded cloth.

The appearence of the surface of the outer cloth was observed according to the following method.

Namely, the sample was put on the stage of a microscope in a dark room, and a spot light was applied at an angle of 70°.

The number of dots which sparkled was observed at a distance of 25mm from the sample.

The results are shown in Table 6.

The case when the value A is less than 1 and the value B is less than 20 is preferable.

Table 6

| Run No. | Inorganic Compound to be added | Organic Compound to be added | Number of dots which sparkled A* | B** |
|---|---|---|---|---|
| 1 | none | none | 28 | 5 |
| 2 | talc | methylene-bis-stearylamide | 0 | 8 |
| 3 | talc | ethylene-bis-stearylamide | 2 | 9 |
| 4 | talc | stearon | 8 | 16 |
| 5 | talc | lithium stearate | 2 | 15 |
| 6 | talc | barium stearate | 0 | 18 |

Table 6-continued

| Run No. | Inorganic Compound to be added | Organic Compound to be added | Number of dots which sparkled A* | B** |
|---|---|---|---|---|
| 7 | talc | tin stearate | 1 | 6 |
| 8 | talc | calcium stearate | 0 | 21 |
| 9 | talc | magnesium stearate | 0 | 6 |
| 10 | talc | aluminum stearate | 1 | 4 |
| 11 | Magnesium hydroxide | magnesium stearate | 0 | 14 |
| 12 | magnesium oxide | magnesium stearate | 1 | 7 |
| 13 | titanium oxide | magnesium stearate | 21 | 12 |

In Table 6, A* shows the number of dots which sparkled strongly, and B** shows the number of dots which sparkled weakly.

We claim:
1. Hot-melt adhesives for fibers consisting essentially of a copolyamide prepared by copolymerizing the following four monomer:
   A. more than 5 and less than 20% by weight on the basis of the total amount of monomers of laurolactam and
   B. resulting portion of comonomers consisting essentially of
      a. 30 to 75% by weight of ε-caprolactam
      b. 5 to 40% by weight of hexamethylenediammonium adipate
      c. 20 to 65% by weight of hexamethylenediammonium sebacate,
   wherein the total of (a), (b), and (c) is 100% by weight.
2. Hot-melt adhesives of claim 1 wherein the copolyamides are in the form of a powder and wherein on the powder surface (a) 0.01 - 0.5 wt% based on the weight of the copolyamide of an inorganic substance having a particle diameter of $0.001\mu - 50\mu$ comprising a nucleating agent for said polyamides and (b) 0.05 - 0.3 wt%, based on the weight of the copolyamide, of at least one compound selected from the group consisting of higher aliphatic amides and metal salts of higher aliphatic carboxylic acids.
3. Hot-melt adhesives of claim 2 wherein said inorganic substances are selected from the group consisting of talc, mica, calcium carbonate, magnesium oxide, silica, magnesium hydroxide, and calcium sulphate.
4. Hot-melt adhesives of claim 2 wherein the higher aliphatic carbonamides are alkylene-bis-carbonamides having 8 - 20 carbon atoms.
5. Hot-melt adhesives for fibers of claim 2 wherein the metal salts of higher aliphatic carboxylic acids are the stearates of a metal belonging to group I or II of the Perodic Table.

* * * * *